US012610217B2

(12) United States Patent
Borillo et al.

(10) Patent No.:    US 12,610,217 B2
(45) Date of Patent:        Apr. 21, 2026

(54) SYSTEMS AND METHODS FOR MODIFYING STANDARD MESSAGES FOR TRANSMISSION TO AND FROM VEHICLES

(71) Applicant: T-Mobile USA, Inc., Bellevue, WA (US)

(72) Inventors: Maricris Borillo, Bothell, WA (US); Gaviphat Lekutai, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 311 days.

(21) Appl. No.: 18/446,279

(22) Filed: Aug. 8, 2023

(65) Prior Publication Data

US 2025/0056191 A1     Feb. 13, 2025

(51) Int. Cl.
| | |
|---|---|
| *H04W 4/12* | (2009.01) |
| *H04M 1/72436* | (2021.01) |
| *H04W 4/02* | (2018.01) |
| *H04W 4/44* | (2018.01) |
| *H04W 4/46* | (2018.01) |

(52) U.S. Cl.
CPC ......... *H04W 4/12* (2013.01); *H04M 1/72436* (2021.01); *H04W 4/023* (2013.01); *H04W 4/44* (2018.02); *H04W 4/46* (2018.02)

(58) Field of Classification Search
CPC ..................................................... H04W 4/12
USPC ..................................................... 455/456.1
See application file for complete search history.

(56) References Cited

U.S. PATENT DOCUMENTS

| | | | | |
|---|---|---|---|---|
| 11,341,784 B2 * | 5/2022 | Lee | ......................... | G07C 5/008 |
| 12,432,536 B2 * | 9/2025 | Shuman | .................. | H04W 4/40 |
| 2014/0088798 A1 * | 3/2014 | Himmelstein | ........ | H04W 4/024 |
| | | | | 701/2 |
| 2021/0166557 A1 * | 6/2021 | Chen | ......................... | A61B 5/18 |
| 2022/0353789 A1 * | 11/2022 | Silver | ................ | G08G 1/09675 |
| 2024/0292352 A1 * | 8/2024 | Kim | .................. | H04W 56/0015 |

FOREIGN PATENT DOCUMENTS

| | | |
|---|---|---|
| CN | 116233792 A | 6/2023 |
| KR | 102140395 B1 | 7/2020 |

OTHER PUBLICATIONS

Search Report for European Application No. 24192931.4, Dated Jan. 30, 2025, 36 pages.

* cited by examiner

*Primary Examiner* — Qutbuddin Ghulamali

(74) *Attorney, Agent, or Firm* — Lee & Hayes, P.C.

(57) ABSTRACT

Systems and methods for using a vehicle-to-vehicle broadcasting system to broadcast a nonstandard message are described herein. The systems and methods provide a user interface that allows a user to input content. The content is used to modify a standard message used in V2X communications to provide nonstandard information to other user equipment within a predetermined distance of the transmitting user equipment.

20 Claims, 5 Drawing Sheets

103A

MEMORY 502

OS
504

APPLICATIONS
506

USER EQUIPMENT 112A

MESSAGE USER
INTERFACE
114A

PROCESSOR
512

REMOVABLE
STORAGE
514

NON-REMOVABLE
STORAGE
516

TRANSCEIVER(S)
518

OUTPUT DEVICE(S)
520

INPUT DEVICE(S)
522

SYSTEMS AND METHODS FOR MODIFYING STANDARD MESSAGES FOR TRANSMISSION TO AND FROM VEHICLES

BACKGROUND

Vehicle communication systems can comprise "vehicle-to-everything" (V2X) communication software or programs that can be used to facilitate the transmission of information from a vehicle to an entity that may affect the vehicle and vice versa. V2X can include components such as vehicle-to-vehicle (V2V), vehicle-to-infrastructure (V2I), vehicle-to-pedestrian (V2P), and vehicle-to-network (V2N) communications. V2X software generally resides at least partially in a memory unit of a vehicle's native computing system, such as an onboard diagnostic (OBD) unit (OBU), which enables the vehicle to act as a communication node when communicating with various entities. The OBD accessory device may be a part of a connected vehicle platform. An OBU is a transceiver that is normally mounted in or on a vehicle, or in some instances may be a portable unit. An RSUs is a transceiver that is mounted along a road or pedestrian passageway. An RSU broadcasts data to OBUs or exchanges data with OBUs in its communications zone.

An OBD accessory device may utilize vehicle data from V2X communications such as forward collision warning, lane change warning, emergency electric brake light warning, and/or roadworks warning to generate traffic data and traffic advisory messages. In some aspects, an OBD device can be a component of a connected vehicle platform. Thus, the OBD accessory device also includes a communication device for transmitting vehicle reports comprising vehicle data to a network entity. In one aspect, the OBD accessory device sends the vehicle report to a base station (e.g., eNode B) via the Uu interface, and then the base station broadcasts specific messages based at least on the vehicle report.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

Examples of the presently disclosed subject matter provide for nonstandard broadcast messages transmitted from an automobile. Nonstandard broadcast messages are messages that are original to a user and created for a purpose intended by the user. For example, a standard broadcast message may include a vehicle's location, speed, and the like. For example, a nonstandard broadcast message may be a message broadcast to nearby vehicles that a red truck has a flat tire. A user interacts with a user interface, either a system installed on the vehicle, or a mobile device application connected to the broadcast system of the vehicle, to generate the nonstandard message. The system receives the nonstandard message and accesses a broadcast system of the vehicle to broadcast the nonstandard message.

In some examples, a communication system of the automobile is modified to transmit a short-range, nonstandard message to one or more recipients within the range of the transmitted message. In one example, a system is configured to modify the basic safety message (BSM) of the SAE J2735-defined protocol to transmit a nonstandard message using various vehicular interfaces, such as a vehicle to network interface (e.g., Uu) and a vehicle-to-vehicle interface (e.g., PC5). A Uu interface (e.g., 5G New Radio Uu, 4G Long Term Evolution (LTE) Uu, or 3G Evolved UMTS Terrestrial Radio Access Network (E-UTRAN) Uu interface) connects vehicles to mobile network base stations and mobile core networks for longer-range Cooperative Intelligent Transport Systems (C-ITS) communications, such as the provision of Internet and V2N communication.

V2N is a type of V2X communication where a vehicle and a serving entity using V2N application are two main agents of the communication and can communicate with each other through an LTE network entity, operating in the traditional mobile broadband spectrum. The nonstandard broadcast messages can use dedicated short-range communication (DSRC) services. DSRC Service involves vehicle-to-vehicle and vehicle-to-infrastructure communications and was designed to assist in protecting the safety of the traveling public. In some examples, other communication services may be used such as cellular VX2 (C-V2X) communication. In some examples, DSRC is a Wi-Fi based protocol, whereas C-V2X is LTE or NR (5G) based protocol. Thus, in some examples, C-V2X can do both direct V2V/V2I communication and Uu V2N communication.

Figure 1:
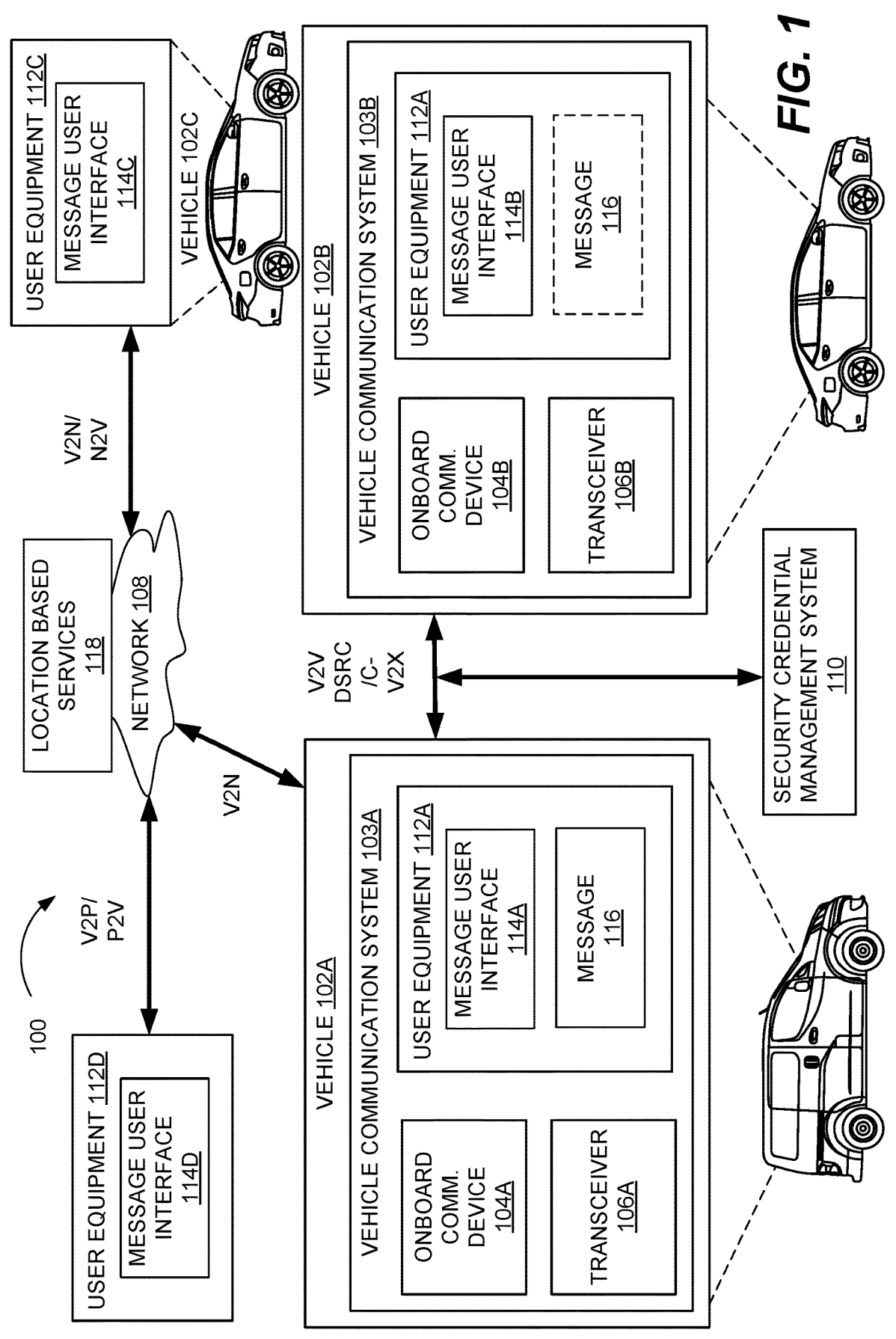
FIG. 1 depicts a system to transmit a nonstandard broadcast message, in accordance with some examples of the present disclosure.

The techniques described herein may be implemented in a number of ways. Example implementations are provided below with reference to the following figures. As shown in FIG. 1, examples of the present disclosure can comprise a system 100 configured to transmit a nonstandard broadcast message. The vehicle 102A includes an onboard communication device 104A, while the vehicle 102B includes an onboard communication device 104B. The onboard communication device 104A and the onboard communication device 104B are applications instantiated (or executed) by the vehicle communication systems 103A and 103B, respectively. The onboard communication device 104A and the onboard communication device 104B are configured to receive content to modify a standard message, modify the standard message with the content to generate a nonstandard message, and then provide that nonstandard message to a transceiver for transmitting and receiving broadcasts in V2N or other communication protocols. In the example illustrated in FIG. 1, the onboard communication device 104A uses transceiver 106A and the onboard communication device 104B uses the transceiver 106B to broadcast and receive V2N communications, cellular communications, BLUETOOTH communications, or DSRC service communications, for example. As noted above, V2N is a type of V2X communication where a vehicle and a serving entity using V2N application are two main agents of the communication and can communicate with each other through a network entity, such as the network 108. DSRC Service involves vehicle-to-vehicle and vehicle-to-infrastructure communications. In some examples, other communication services may be used such as cellular VX2 (C-V2X) communication using the network 108. C-V2X services provide additional capabilities like direct communication with pedestrians, e.g., V2P. The presently disclosed subject matter is not limited to any particular type of message broadcast protocol or technology. It should be noted that V2V services may also use PC5 protocol depending on the equipment used.

In some examples, communications between the onboard communication device 104A and the onboard communication device 104B may be secured using a credential system, such as a security credential management system (SCMS) 110. In some examples, the SCMS 110 executes a public key infrastructure (PKI) to secure V2X messages such as BSMs. The SCMS 110 secures messages by issuing a certificate to the onboard communication device 104A and the onboard communication device 104B, encrypts the messages between the onboard communication device 104A and the onboard communication device 104B, and authenticates the messages between the onboard communication device 104A and the onboard communication device 104B. To transmit messages between the vehicle 102A and the vehicle 102B, the vehicles 102A/102B first send a registration request to the SCMS 110. After approving the request, the SCMS 110 issues an enrolment certificate to the vehicles 102A/102B. The enrolment certificate acts as the ID for the vehicles 102A/102B, proving itself as an authorized participant. When transmitting a message, the onboard communication device 104A, for example, receives an identification certificate from the SCMS 110. This certificate acts as a digital signature that gets attached to the message. When receiving a message, the SCMS 110 compares the onboard communication device 104A digital signature with a list of previously revoked signatures to ensure that the signature is currently valid. After passing all verifications, the message is given to the onboard communication device 104B to process. It should be noted, however, that the presently disclosed subject matter is not limited to the use of the SCMS 110 or authentication protocols such as those associated with the use of the SCMS 110.

The vehicle 102A includes a vehicle communication system 103A and the vehicle 102B includes a vehicle communication system 103. The vehicle communication systems 103A and 103B may be communication "hubs" installed into the vehicles 102A and 102B. These bubs can be computing devices capable of providing the functionality described herein. The vehicle communication system 103A includes user equipment (UE) 112A and the vehicle communication system 103B includes the user equipment 112B. The user equipment 112A and/or the user equipment 112B may be a communication interface capable of displaying information and receiving inputs and is instantiated (or executed) by the vehicle communication system 103A or 103B, respectively. In some examples, the UE 112A and/or the UE 112B are displays on their respective vehicle communication systems. The vehicle communication system 103A and/or the vehicle communication system 103B may also be a device capable of receiving one or more types of communications, such as a cellular device, a tablet, a computer, and the like. The presently disclosed subject matter is not limited to any particular type of user equipment 112A and/or 112B. In FIG. 1, the UE 112A is capable of communicating with the network 108, such as through a cellular connection, Wi-Fi connection, and the like, as well as the onboard communication device 104A through transceiver 106A. Further in FIG. 1, a UE 112C is present in or near vehicle 102C. However, unlike the UE 112A and/or the UE 112B, the UE 112C is not associated with the vehicle 102C, meaning, the UE 112C operates independently of the vehicle 102C. For example, the UE 112C may be a cellular device used by a passenger of the vehicle 102C. A UE 112D is also illustrated in FIG. 1. The UE 112D may be a cellular device carried by a person, such as a pedestrian walking along a street.

In FIG. 1, the UE 112A includes a message user interface 114A, the UE 112B includes a message UI 114B, the UE 112C includes a message UI 114C, and the UE 112D includes a message UI 114D (hereinafter referred to individually as "the message UI 114A," the message UI 114B," and the like, and collectively as "the message UIs 114"). In some examples, the message UIs 114A and 114B are instantiated (or executed) by the vehicle communicate system 103A and 103B, respectively, and are displays within the UEs 112A and 112B, respectively. In some examples, the message UIs 114C and 114D are applications executing on input/output and display devices (such as a cellular device). The message UIs 114A allow a user (not shown) to either input content to modify a standard message to a non-standard message for broadcast, or receive a broadcasted non-standard message, described in more detail in FIG. 2, below. The message UIs 114A and 114B in vehicles 102A and 102B, respectively, communicate with the transceivers 106A and 106B, respectively. The UEs 112C and 112D are cellular devices with transceivers for communicating with the network 108.

For example, the message UI 114A may receive an input to broadcast a message 116 "Red car has flat tire" to vehicles or people proximate to the vehicle 102A. As used herein, "proximate" generally means a broadcast area covered by a broadcast protocol or the capabilities of the devices performing the transmission. In one example, C-V2X industry requirements specify that the minimum range of a V2X communication is approximately 300 meters in the United States, with the minimum distance potentially varying country to country or region to region. It should be noted that the transmission may be broadcast at distances greater than the minimum, and the presently disclosed subject matter is not limited to any particular distance.

Returning to the present example, once the message UI 114A receives the input to broadcast the message 116, the message UI 114A communicates the message 116 to the onboard communication device 104A. In the example illustrated in FIG. 1, the system 100 uses the basic safety message of the SAE J2735-defined protocol to transmit messages. To transmit a non-standard message, the BSM message is modified by the onboard communication device 104A by appending or replacing parts of a standard message with the information entered into the message UI 114A to create the non-standard message 116. In one example, for the BSM via Uu, a slot of plain text in BSM is translated in a V2X application or automotive cloud. As discussed above, BSM is merely exemplary, as other communication protocols may be used and are considered to be within the scope of the presently disclosed subject matter. The onboard communication device 104A communicates the message 116 to the transceiver 106A for transmission to other entities.

One entity that may receive the broadcast of the message 116 from the onboard communication device 104A may be the onboard communication device 104B of vehicle 102B. The transceiver 106B receives the message 116 (a nonstandard message) and communicates the message 116 to the onboard communication device 104B. The onboard communication device 104B provides the message 116 to the message UI 114B of the UE 112B of the vehicle 102B for display on the message UI 114B. This is an example of a V2V (vehicle-to-vehicle) transmission using the DSRC services of the vehicles 102A and 102B.

However, as mentioned above, the transceiver 106A may broadcast the message 116 using other technologies. In this manner, also illustrated in FIG. 1, the transceiver 106A can also transmit the message 116 to the UE 112C (e.g., a cellular device carried by a user in a vehicle) and/or the UE 112D (e.g., a pedestrian carrying a cellular device). The transmission to the UE 112C is a type of V2N (vehicle-to-network) transmission and the transmission to the UE 112D is an example of a V2P (vehicle-to-pedestrian) transmission. To determine which (if any) UE 112C and/or 112D receives the message 116, when receiving the message 116 from the transceiver 106A, the network 108 accesses location-based services (LBS) 118. The LBS 118, when receiving the message 116, determines the user equipment within a predetermined distance from the vehicle 102A. The location can be determined using various technologies, including a global position system, signal strength geolocation, multi-lateration, and the like. The presently disclosed subject matter is not limited to any location technology. The LBS 118 thus narrows down the receivers of the message 116 to UEs within a predetermined distance to which the message 116 may apply. In some examples, the predetermined distance is the same as a broadcast distance of the transceiver 106A but may be greater than or less than the broadcast distance. In FIG. 1, the network 108 determines that the UE 112C (V2N) and the UE 112D (V2P) are within a predetermined distance and transmits, using a cellular signal, the message 116 to the message UI 114C and the message UI 114D, respectively. The message UI 114C provides functionality similar to the message UI 114D, meaning that a passenger in the vehicle 102C can use the message UI 114C to send and receive nonstandard messages.

Figure 2:
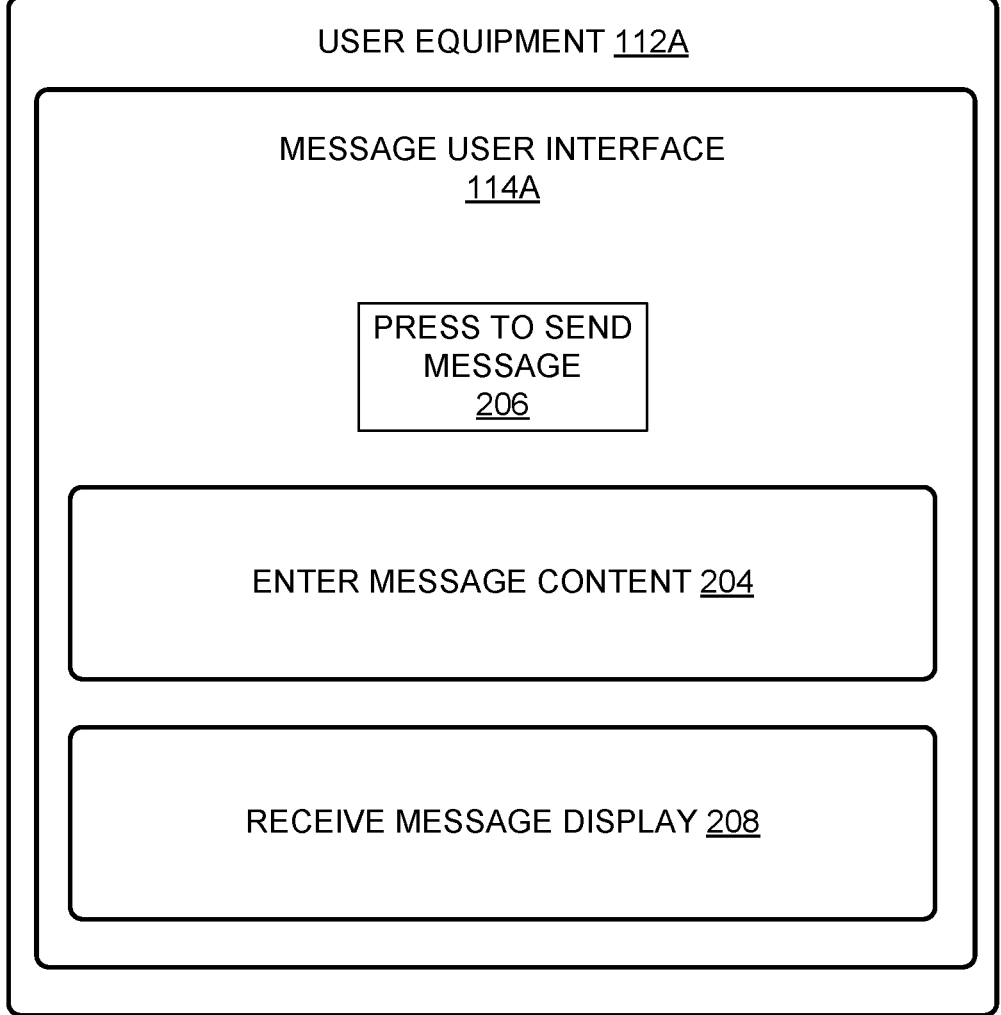
FIG. 2 is an illustration of a user equipment in communication with an onboard communication device, in accordance with some examples of the present disclosure.

FIG. 2 is an illustration of the UE 112A in communication with the onboard communication device 104A, in accordance with some examples of the presently disclosed subject matter. In FIG. 2, the UE 112A can be a display panel integrated into the vehicle 102A, a cellular phone, tablet, or computing device using Wi-Fi or BLUETOOTH (or other communication protocol) to communicatively connect to the onboard communication device 104A, and the like. The message UI 114A of the UE 112A is configured to allow a user to enter content to modify a standard message to create the nonstandard message 116. To enter the content, the message UI 114A includes an enter message content interface 204. The enter message content interface 204 is configured to receive an input from a user, the input being the content for the message 116 to be transmitted. To send a message, a user will select the enter message content interface 204 and type in content for the message. The user then selects a press to send message 206 interface in the message user interface 114A and the content for the message 116 is transmitted to the onboard communication device 104A. Once the message UI 114A receives the input to broadcast the message 116, the message UI 114A communicates the message 116 to the onboard communication device 104A, which modifies a standard message with the content to create the nonstandard message. In some examples, the network 108 may receive the content and modify a standard message to create the message 116 for transmission to various entities.

As noted above, in some examples, the system 100 uses the basic safety message of the SAE J2735-defined protocol to transmit messages. To transmit the message 116, the standard BSM message is modified by the onboard communication device 104A by appending or replacing parts of the standard BSM message with the information entered into the enter message content interface 204 to create the nonstandard message 116. In one example, for the BSM via Uu, a slot of plain text in BSM is translated in a V2X application or automotive cloud. As discussed above, BSM is merely exemplary, as other communication protocols may be used and are considered to be within the scope of the presently disclosed subject matter. The onboard communication device 104A communicates the message 116 to the transceiver 106A for transmission to other entities. The message UI 114A further includes a receive message display 208 to display messages received from other UEs 112. While FIG. 2 illustrates the UE 112A that uses systems of a vehicle to communicate a message, i.e., the onboard communication device 104A and the transceiver 106A, nonstandard messages may be received and broadcast using mobile devices through the network 108, an example of which is provided in FIG. 3.

Figure 3:
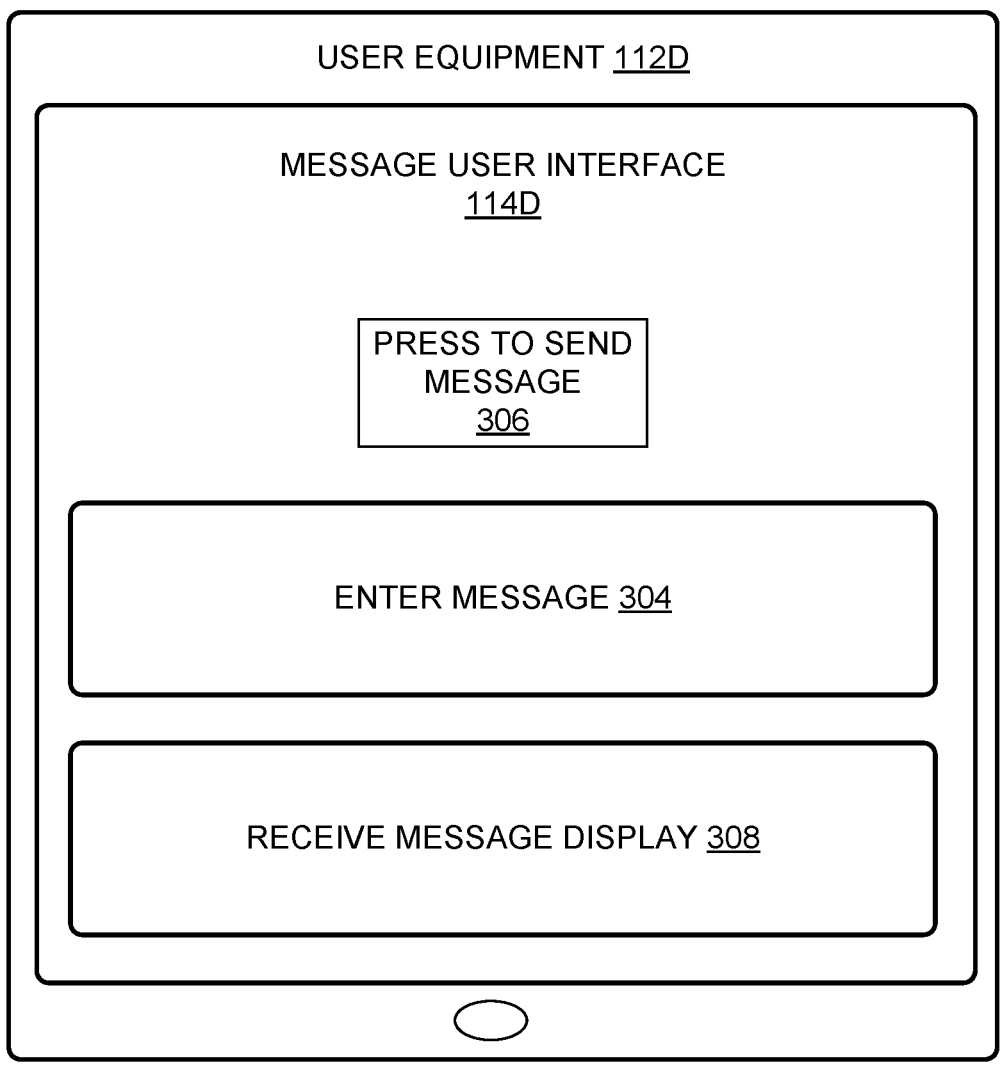
FIG. 3 is an illustration of a user equipment that is a cellular-enabled device configured to transmit and receive nonstandard V2X messages, in accordance with some examples of the present disclosure.

FIG. 3 is an illustration of the UE 112D, which is a cellular-enabled device configured to transmit and receive nonstandard V2X messages, in accordance with various examples of the presently disclosed subject matter. The UE 112D includes the message UI 114D, which is an application installed on and executed by the UE 112D. The message UI 114D is designed to mimic the functionality of the UE 112A, whereby some functions are provided by the network 108 rather than the UE 112A. For example, the UE 112D may not be registered or capable of using the V2V DSRC system, and thus, not be able to communicate directly with the vehicle 102A. Rather, the UE 112D uses the network 108 to broadcast and receive messages to and from other UEs 112 configured to receive nonstandard messages to provide for V2P and/or P2V communications. The message UI 114D of the UE 112D is configured to allow a user to enter the message 116. To enter the message 116, the message UI 114D includes an enter message interface 304. The enter message interface 304 is configured to receive an input from a user, the input being the message 116 to be transmitted. To send a message, a user will select the enter message 304 and type in a message, e.g., the message 116, to be transmitted. The user then selects the press to send message 306 and the message 116 is transmitted to the network 108. The network 108 uses the LBS 118 to determine the location of the UE 112D. The network 108 then uses the LBS 118 to determine the UEs 112 within a predetermined distance of the UE 112D. The network 108 then transmits the message 116 to the UEs 112 within the predetermined distance of the UE 112D. The message UI 114D further includes a receive message display 308 to display messages received from other UEs 112.

Figure 4:
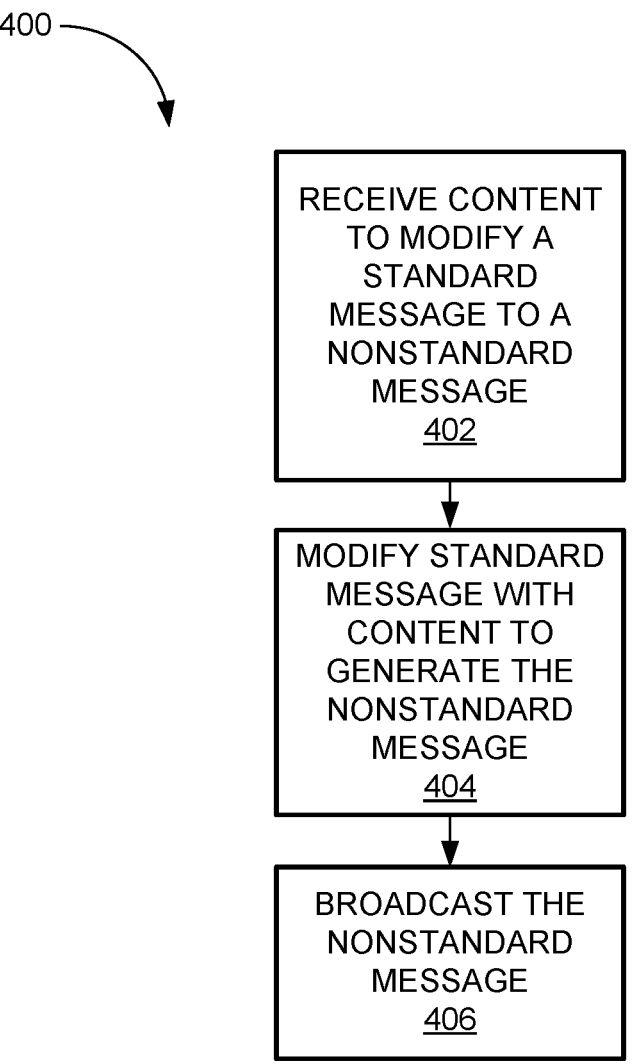
FIG. 4 is an illustrative process for transmitting a nonstandard V2X message, in accordance with various examples of the presently disclosed subject matter

FIG. 4 is an illustrative process 400 for transmitting a nonstandard V2X message, in accordance with various examples of the presently disclosed subject matter. The process and other processes described herein are illustrated as example flow graphs, each operation of which may represent a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Referring to FIG. 4, the process 400 commences at operation 402, where the content to modify a standard (e.g., BSM) message to generate the nonstandard message 116 is received. The content can be entered using the message UI 114A. In the context of a V2V, V2N, and/or a V2P communication originating from the vehicle 102A, the content is received at the onboard communication device 104A from the message user interface 114A, wherein the message UI 114A is instantiated (or executed) by the vehicle communication system 103A. In this example, the transceiver 106A is the broadcasting entity. In the context of a V2P/P2V/V2N communication received from the UE 112C or the UE 112D, the message 116 is received at the network 108 from the UE 112C or the UE 112D, meaning the network 108 is the broadcasting entity. It should be noted that the vehicles 102A and 102B can also transmit the message 116 to the network 108 in a manner similar to the UEs 112C and 112D either in combination with or as an alternative to a broadcast by the transceiver 106A.

The process 400 continues to operation 404, where the standard message typically transmitted is modified by the nonstandard message 116. If the message 116 is received at the onboard communication device 104A for broadcast by the transceiver 106, the onboard communication device 104A modifies the standard message to create the message 116. If the message 116 is received at the network 108, either the network 108 or the onboard communication device 104A modifies the standard message to create the nonstandard message 116. In some examples, the network 108 may utilize a short message service-service center (SMSC) node in the network to convert the V2X message to a plain text short message service (SMS) or multimedia messaging service (MMS) communication to user equipment within the network or within a geographic proximity to the onboard communication device 104A, such as the UE 112C and/or the UE 112D within the network.

The process 400 continues to operation 406, where the message 116 is broadcast. In the context of a V2V, V2N, and/or a V2P communication originating from the vehicle 102A, the content is received at the onboard communication device 104A from the message user interface 114A, meaning the transceiver 106A is the broadcasting entity. Thus, the transceiver 106A broadcasts the message 116. In the context of a V2P/P2V/V2N communication received from the UE 112C or the UE 112D, the message 116 is received at the network 108 from the UE 112C or the UE 112D, meaning the network 108 is the broadcasting entity. Thus, the network 108 broadcast the message 116.

Figure 5:
FIG. 5 depicts a component level view of a vehicle communications system for use with the systems and methods described herein, in accordance with some examples of the present disclosure.

FIG. 5 depicts a component level view of the vehicle communication system 103A for use with the systems and methods described herein. The vehicle communication system 103A could be any device capable of communicating using the network 108. The vehicle communication system 103A can comprise several components to execute the above-mentioned functions. As discussed below, the vehicle communication system 103A can comprise memory 502 including an operating system (OS) 504 and one or more applications 506. The applications 506 can include many features common to user equipment such as, for example, applications initiated using voice commands (such as Internet searches, home appliance controls, and the like), music player, Internet radio, and other such applications. In this case, the applications 506 can also comprise a video call application, an audio call application, and a messaging application to enable users to engage in audio calls, video calls, and messaging, among other things. The applications 506 can also include contacts to enable the user to select a contact to initiate, for example, a video call, audio call, text message, etc. The vehicle communication system 103A can also comprise UE 112A. The UE 112A may be communication interface capable of displaying information and receiving inputs. In some examples, the UE 112A may be a display.

The vehicle communication system 103A can also comprise one or more processors 512 and one or more of removable storage 514, non-removable storage 516, transceiver(s) 518, output device(s) 520, and input device(s) 522. In various implementations, the memory 502 can be volatile (such as random access memory (RAM)), non-volatile (such as read only memory (ROM), flash memory, etc.), or some combination of the two. In some examples, rather than being stored in the memory 502, some, or all, of the applications 506, and other information, can be stored on a remote server or a cloud of servers accessible by the vehicle communication system 103A.

The memory 502 can also include the OS 504. The OS 504 varies depending on the manufacturer of the vehicle communication system 103A. The OS 504 contains the modules and software that support basic functions of the vehicle communication system 103A, such as scheduling tasks, executing applications, and controlling peripherals. In some examples, the OS 504 can enable the UE 112A and the message UI 114A, and provide other functions, as described above, via the transceiver(s) 518.

The vehicle communication system 103A can also comprise one or more processors 512. In some implementations, the processor(s) 512 can be one or more central processing units (CPUs), graphics processing units (GPUs), both CPU and GPU, or any other processing unit. The vehicle communication system 103A may also include additional data storage devices (removable and/or non-removable) such as, for example, magnetic disks, optical disks, or tape. Such additional storage is illustrated in FIG. 5 by removable storage 514 and non-removable storage 516.

Non-transitory computer-readable media may include volatile and nonvolatile, removable and non-removable tangible, physical media implemented in technology for storage of information, such as computer readable instructions, data structures, program modules, or other data. The memory 502, removable storage 514, and non-removable storage 516 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information and which can be accessed by the vehicle communication system 103A. Any such non-transitory computer-readable media may be part of the vehicle communication system 103A or may be a separate database, databank, remote server, or cloud-based server.

In some implementations, the transceiver(s) 518 include any transceivers known in the art. In some examples, the transceiver(s) 518 can include wireless modem(s) to facilitate wireless connectivity with other components (e.g., between the vehicle communication system 103A and a wireless modem that is a gateway to the Internet), the Internet, and/or an intranet. Specifically, the transceiver(s) 518 can include one or more transceivers that can enable the vehicle communication system 103A to send and receive data from the vehicle 102A, video calls, audio calls, and messages and to perform other functions. Thus, the transceiver(s) 518 can include multiple single-channel transceivers or a multi-frequency, multi-channel transceiver to enable the vehicle communication system 103A to send and receive video calls, audio calls, messaging, etc. The transceiver(s) 518 can enable the vehicle communication system 103A to connect to multiple networks including, but not limited to 2G, 3G, 4G, 5G, and Wi-Fi networks. The transceiver(s) can also include one or more transceivers to enable the vehicle communication system 103A to connect to future (e.g., 6G) networks, Internet-of-Things (IoT), machine-to machine (M2M), and other current and future networks.

The transceiver(s) 518 may also include one or more radio transceivers that perform the function of transmitting and receiving radio frequency communications via an antenna (e.g., Wi-Fi, DSRC, or Bluetooth®). In other examples, the transceiver(s) 518 may include wired communication components, such as a wired modem or Ethernet port, for communicating via one or more wired networks. The transceiver(s) 518 can enable the vehicle communication system 103A to make audio and video calls, download files, access web applications, and provide other communications associated with the systems and methods, described above.

In some implementations, the output device(s) 520 include any output devices known in the art, such as a display (e.g., a liquid crystal or thin-film transistor (TFT) display), a touchscreen, speakers, a vibrating mechanism, or a tactile feedback mechanism. Thus, the output device(s) can include a screen or display. The output device(s) 520 can also include speakers, or similar devices, to play sounds or ringtones when an audio call or video call is received. Output device(s) 520 can also include ports for one or more peripheral devices, such as headphones, peripheral speakers, or a peripheral display.

In various implementations, input device(s) 522 include any input devices known in the art. For example, the input device(s) 522 may include the UE 112A, a camera, a microphone, or a keyboard/keypad. The input device(s) 522 can include a touch-sensitive display or a keyboard to enable users to enter content for the message 116 and make requests and receive responses via web applications (e.g., in a web browser), make audio and video calls, and use the applications 506, among other things. In some examples, the input device(s) 522 may be a communication cable connected between the vehicle communication system 103A and an output/input of the vehicle 102A such that communications between the vehicle communication system 103A and the vehicle 102A is a wired connection. The touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. A touch sensitive display can act as both an input device 522 and an output device 520.

Example Clauses

The following paragraphs describe various examples. Any of the examples in this section may be used with any other of the examples in this section and/or any of the other examples or embodiments described herein.

A: All methods, systems, and apparatuses, including all equivalents, disclosed.

Clause 1. A system comprising: a memory storing computer-executable instructions; and a processor in communication with the memory, the computer-executable instructions causing the processor to perform acts comprising: receiving content to modify a standard message, wherein the standard message uses a vehicle-to-network interface or a vehicle-to-vehicle interface; modifying the standard message with the content to generate a nonstandard message; and broadcasting the nonstandard message.

Clause 2. The system of clause 1, wherein the act comprising receiving the content to modify a standard message comprises the acts of: instantiating a user equipment in a vehicle communicate system; instantiating a message user interface in the user equipment; displaying an enter message content interface in the message user interface, wherein the message user interface is configured to receive the content; and displaying a press to send message interface, wherein the press to send interface is configured to provide the content received at the enter message content interface to an onboard communication device.

Clause 3. The system of any of clauses 1 or 2, wherein the act comprising modifying the standard message with the content to generate the nonstandard message comprises: receiving, at the onboard communication device, the content to modify the standard message; modifying, by the onboard communication device, the standard message with the content by appending the standard message with the content to generate the nonstandard message; and providing the nonstandard message to a transceiver.

Clause 4. The system of any of clauses 1-4, the acts further comprising broadcasting, by the transceiver, the nonstandard message using a dedicated short-range communication service or C-V2X communication service.

Clause 5. The system of any of clauses 1-5, wherein the dedicated short-range communicate service comprises a vehicle-to-vehicle communication, a vehicle-to-infrastructure communication, or a cellular vehicle-to-network communication.

Clause 6. The system of any of clauses 1-3, wherein the standard message is transmitted by a vehicle, wherein the standard message comprises a basic safety message (BSM) of a SAE J2735-defined protocol using the vehicle-to-network interface or the vehicle-to-vehicle interface of the vehicle.

Clause 7. The system of any of clauses 1-6, wherein the vehicle to network interface comprises a New Radio, Long Term Evolution, or UMTS Uu interface and the vehicle-to-vehicle interface comprises a PC5 interface.

Clause 8. The system of any of clauses 1-7, wherein the act comprising receiving the content to modify a standard message comprises the acts of: instantiating a message user interface in a user equipment, wherein the user equipment is a cellular device; displaying an enter message content interface in the message user interface, wherein the message user interface is configured to receive the content; and displaying a press to send message interface, wherein the press to send interface is configured to provide the content received at the enter message content interface to an onboard communication device.

Clause 9. The system of any of clauses 1-8, wherein the act comprising modifying the standard message with the content to generate the nonstandard message comprises modifying, by user equipment, the standard message with the content by appending the standard message with the content to generate the nonstandard message.

Clause 10. The system of any of clauses 1-9, the acts further comprising transmitting, by the user equipment, the nonstandard message to a cellular network.

Clause 11. A method comprising: a memory storing computer-executable instructions; and a processor in communication with the memory, the computer-executable instructions causing the processor to perform acts comprising: receiving content to modify a standard message transmitted by a vehicle; modifying the standard message with the content to generate a nonstandard message; and broadcasting the nonstandard message.

Clause 12. The method of clause 11, wherein receiving the content to modify a standard message comprises: instantiating a user equipment in a vehicle communicate system; instantiating a message user interface in the user equipment; displaying an enter message content interface in the message user interface, wherein the message user interface is configured to receive the content; and displaying a press to send message interface, wherein the press to send interface is configured to provide the content received at the enter message content interface to an onboard communication device.

Clause 13. The method of and of clause 11 or 12, wherein modifying the standard message with the content to generate the nonstandard message comprises: receiving, at the onboard communication device, the content to modify the standard message; modifying, by the onboard communication device, the standard message with the content by appending the standard message with the content to generate the nonstandard message; and providing the nonstandard message to a transceiver.

Clause 14. The method of any of clauses 11-13, further comprising broadcasting, by the transceiver, the nonstandard message using a dedicated short-range communicate service.

Clause 15. The method of any of clauses 11-14, wherein the dedicated short-range communicate service comprises a vehicle-to-vehicle communication, a vehicle-to-infrastructure communication, or a cellular vehicle-to-network communication.

Clause 16. The method of any of clauses 11-15, wherein the standard message comprises a basic safety message (BSM) of a SAE J2735-defined protocol using a vehicle to network interface or a vehicle-to-vehicle interface.

Clause 17. The method of any of clauses 11-16, wherein the vehicle to network interface comprises a New Radio, Long Term Evolution, or UMTS Uu interface, and wherein the vehicle-to-vehicle interface comprises a PC5 interface.

Clause 18. A non-transitory computer-readable media storing computer-executable instructions that, when executed by one or more processors, cause the one or more processors to perform operations comprising: receiving content from a first user equipment to modify a standard message transmitted to a vehicle; modifying the standard message with the content to generate a nonstandard message; and broadcasting the nonstandard message to a second user equipment.

Clause 19. The non-transitory computer-readable media of clause 18, wherein receiving content to modify the standard message transmitted by the vehicle comprise instructions to cause the processor to perform an operation comprising modifying the standard message with the content by appending the standard message with the content to generate the nonstandard message.

Clause 20. The non-transitory computer-readable media of clause 18 or 19, wherein broadcasting the nonstandard message to a second user equipment comprise instructions to cause the processor to perform an operation comprising: determining a location of the first user equipment; accessing a location-based service; and determining that the location of the second user equipment is within a predetermined distance of the location of the first user equipment.

While the example clauses described above are described with respect to one particular implementation, it should be understood that, in the context of this document, the content of the example clauses can also be implemented via a method, device, system, computer-readable medium, and/or another implementation. Additionally, any of the examples A-S can be implemented alone or in combination with any other one or more of the examples A-S.

CONCLUSION

Depending on the embodiment, certain operations, acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, components, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and components described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements, and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Unless otherwise explicitly stated, articles such as "a" or "the" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

Although the subject matter has been described in language specific to structural features and/or methodological acts, it is to be understood that the subject matter defined in the appended claims is not necessarily limited to the specific features or acts described.

The presently disclosed examples are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A system comprising:
a memory storing computer-executable instructions; and
a processor in communication with the memory, the computer-executable instructions causing the processor to perform acts comprising:
receiving content, via a user equipment, that includes user input generated by a user associated with the system, wherein the system uses a vehicle-to-network interface or a vehicle-to-vehicle interface;
modifying a standard message with the content to generate a nonstandard message such that the nonstandard message includes the user input; and
broadcasting the nonstandard message.

2. The system of claim 1, wherein the act comprising receiving the content to modify a standard message comprises the acts of:
instantiating the user equipment in a vehicle communicate system;
instantiating a message user interface in the user equipment;
displaying an enter message content interface in the message user interface, wherein the message user interface is configured to receive the content; and
displaying a press to send message interface, wherein the press to send interface is configured to provide the content received at the enter message content interface to an onboard communication device.

3. The system of claim 2, wherein the act comprising modifying the standard message with the content to generate the nonstandard message comprises:
receiving, at the onboard communication device, the content to modify the standard message;
modifying, by the onboard communication device, the standard message with the content by appending the standard message with the content to generate the nonstandard message; and
providing the nonstandard message to a transceiver.

4. The system of claim 3, the acts further comprising broadcasting, by the transceiver, the nonstandard message using a dedicated short-range communication service or C-V2X communication service.

5. The system of claim 4, wherein the dedicated short-range communicate service comprises a vehicle-to-vehicle communication, a vehicle-to-infrastructure communication, or a cellular vehicle-to-network communication.

6. The system of claim 1, wherein the standard message is transmitted by a vehicle, wherein the standard message comprises a basic safety message (BSM) of a SAE J2735-defined protocol using the vehicle-to-network interface or the vehicle-to-vehicle interface of the vehicle.

7. The system of claim 6, wherein the vehicle to network interface comprises a New Radio, Long Term Evolution, or UMTS Uu interface and the vehicle-to-vehicle interface comprises a PC5 interface.

8. The system of claim 1, wherein the act comprising receiving the content to modify a standard message comprises the acts of:
instantiating a message user interface in a user equipment, wherein the user equipment is a cellular device;
displaying an enter message content interface in the message user interface, wherein the message user interface is configured to receive the content; and
displaying a press to send message interface, wherein the press to send interface is configured to provide the content received at the enter message content interface to an onboard communication device.

9. The system of claim 8, wherein the act comprising modifying the standard message with the content to generate the nonstandard message comprises modifying, by user equipment, the standard message with the content by appending the standard message with the content to generate the nonstandard message.

10. The system of claim 9, the acts further comprising transmitting, by the user equipment, the nonstandard message to a cellular network.

11. A method comprising:

a memory storing computer-executable instructions; and a processor in communication with the memory, the computer-executable instructions causing the processor to perform acts comprising:

receiving content to modify a standard message transmitted by a vehicle, wherein the content includes user input generated by a user associated with the vehicle and inputted via a user equipment;

modifying the standard message with the content to generate a nonstandard message such that the nonstandard message includes the user input; and broadcasting the nonstandard message.

12. The method of claim 11, wherein receiving the content to modify a standard message comprises:

instantiating the user equipment in a vehicle communicate system;

instantiating a message user interface in the user equipment;

displaying an enter message content interface in the message user interface, wherein the message user interface is configured to receive the content; and displaying a press to send message interface, wherein the press to send interface is configured to provide the content received at the enter message content interface to an onboard communication device.

13. The method of claim 12, wherein modifying the standard message with the content to generate the nonstandard message comprises:

receiving, at the onboard communication device, the content to modify the standard message;

modifying, by the onboard communication device, the standard message with the content by appending the standard message with the content to generate the nonstandard message; and providing the nonstandard message to a transceiver.

14. The method of claim 13, further comprising broadcasting, by the transceiver, the nonstandard message using a dedicated short-range communicate service.

15. The method of claim 14, wherein the dedicated short-range communicate service comprises a vehicle-to-vehicle communication, a vehicle-to-infrastructure communication, or a cellular vehicle-to-network communication.

16. The method of claim 11, wherein the standard message comprises a basic safety message (BSM) of a SAE J2735-defined protocol using a vehicle to network interface or a vehicle-to-vehicle interface.

17. The method of claim 16, wherein the vehicle to network interface comprises a New Radio, Long Term Evolution, or UMTS Uu interface, and wherein the vehicle-to-vehicle interface comprises a PC5 interface.

18. A non-transitory computer-readable media storing computer-executable instructions that, when executed by one or more processors, cause the one or more processors to perform operations comprising:

receiving content from a first user equipment to modify a standard message transmitted to a vehicle, wherein the content includes user input generated by a user associated with the vehicle and inputted via the first user equipment;

modifying the standard message with the content to generate a nonstandard message such that the nonstandard message includes the user input; and broadcasting the nonstandard message to a second user equipment.

19. The non-transitory computer-readable media of claim 18, wherein receiving content to modify the standard message transmitted by the vehicle comprise instructions to cause the processor to perform an operation comprising modifying the standard message with the content by appending the standard message with the content to generate the nonstandard message.

20. The non-transitory computer-readable media of claim 18, wherein broadcasting the nonstandard message to a second user equipment comprise instructions to cause the processor to perform an operation comprising:

determining a location of the first user equipment;

accessing a location-based service; and determining that the location of the second user equipment is within a predetermined distance of the location of the first user equipment.

\* \* \* \* \*